(12) United States Patent
Grasso et al.

(10) Patent No.: US 10,518,760 B2
(45) Date of Patent: Dec. 31, 2019

(54) SYSTEMS FOR CONTROLLING A RAILWAY TRAIN FOR THE TRANSPORT OF GOODS COMPRISING A PLURALITY OF LOCOMOTIVES

(71) Applicant: FAIVELEY TRANSPORT ITALIA S.P.A., Piossasco (Turin) (IT)

(72) Inventors: Angelo Grasso, Canelli (IT); Stefano Lucarelli, Turin (IT); Roberto Tione, Lauriano (IT)

(73) Assignee: FAIVELEY TRANSPORT ITALIA S.P.A., Piossasco (Turin) (IT)

(*) Notice: Subject to any disclaimer, the term of this patent is extended or adjusted under 35 U.S.C. 154(b) by 145 days.

(21) Appl. No.: 15/750,625

(22) PCT Filed: Aug. 9, 2016

(86) PCT No.: PCT/IB2016/054781
§ 371 (c)(1),
(2) Date: Feb. 6, 2018

(87) PCT Pub. No.: WO2017/025895
PCT Pub. Date: Feb. 16, 2017

(65) Prior Publication Data
US 2019/0217838 A1 Jul. 18, 2019

(30) Foreign Application Priority Data
Aug. 10, 2015 (IT) .................. 102015000043685

(51) Int. Cl.
*B60T 13/66* (2006.01)
*B60T 17/22* (2006.01)
*B60T 8/17* (2006.01)

(52) U.S. Cl.
CPC .......... *B60T 13/665* (2013.01); *B60T 17/228* (2013.01); *B60T 8/1705* (2013.01)

(58) Field of Classification Search
CPC ..... B60T 13/665; B60T 17/228; B60T 8/1705
(Continued)

(56) References Cited

U.S. PATENT DOCUMENTS 3,653,723 A 4/1972 Worbois
4,013,323 A * 3/1977 Burkett ................ B60T 13/665
303/20

(Continued)

*Primary Examiner* — Thomas W Irvin
(74) *Attorney, Agent, or Firm* — Arent Fox LLP; Michael Fainberg (57) ABSTRACT

The system provides for the control of a railway train for the transport of goods, comprising a plurality of wagons a master locomotive at the head of the train and one or more slave locomotives distributed along the train. The train is equipped with a pneumatic brake pipe which extends along the whole train. The master locomotive is equipped with a master control system for controlling the train, and the at least one slave locomotive is equipped with a slave control system subordinated to the master control system. The master and slave systems can communicate with each other via a radio channel. The or each slave system is designed to control traction apparatuses, apparatuses for controlling the pressure in the brake pipe and apparatuses for applying the emergency brake of the corresponding slave locomotive, and for retransmitting signals indicating the status of these apparatuses of the slave locomotive to the master system.

7 Claims, 6 Drawing Sheets

(58) Field of Classification Search
USPC .............................. 303/3, 7, 8, 128, 132, 135
See application file for complete search history.

(56) References Cited

U.S. PATENT DOCUMENTS

| | | | | |
|---|---|---|---|---|
| 5,740,029 | A * | 4/1998 | Ferri | B60T 13/665 |
| | | | | 246/182 B |
| 5,950,967 | A * | 9/1999 | Montgomery | B60L 15/32 |
| | | | | 246/122 R |
| 6,375,276 | B1 * | 4/2002 | Delaruelle | B60L 15/32 |
| | | | | 303/128 |
| 6,401,015 | B1 * | 6/2002 | Stewart | B60T 13/665 |
| | | | | 303/7 |
| 7,762,631 | B2 * | 7/2010 | Smith | B60T 17/228 |
| | | | | 303/128 |
| 8,190,311 | B2 | 5/2012 | Smith | |
| 9,340,195 | B2 * | 5/2016 | Smith | B60T 17/228 |
| 2002/0089232 | A1 | 7/2002 | Smith et al. | |
| 2007/0236079 | A1 * | 10/2007 | Kull | B60T 13/665 |
| | | | | 303/7 |
| 2010/0235022 | A1 * | 9/2010 | Siddappa | B61C 17/12 |
| | | | | 701/20 |
| 2018/0050711 | A1 * | 2/2018 | Rice | B61L 15/0036 |
| 2019/0054936 | A1 * | 2/2019 | Tione | B60T 13/665 |

\* cited by examiner

SYSTEMS FOR CONTROLLING A RAILWAY TRAIN FOR THE TRANSPORT OF GOODS COMPRISING A PLURALITY OF LOCOMOTIVES

CROSS-REFERENCE TO RELATED APPLICATIONS

This application is the U.S. National Stage Application of International Patent Application No. PCT/IB2016/054781, filed on Aug. 9, 2016, which claims priority to Italian Patent Application No. 102015000043685, filed on Aug. 10, 2015, the contents of each of which is incorporated herein by reference in its entirety.

FIELD OF TECHNOLOGY

The present invention relates to a system for controlling a railway train for the transport of goods comprising a plurality of locomotives.

BACKGROUND

In the European context, a railway train for the transport of goods typically comprises a locomotive which hauls a plurality of wagons. The maximum length of a train of this type is specified by the European standards authority UIC (Union Internationale des Chemins de Fer) and is based on the functional characteristics of the braking system, which are also governed by this authority.

Some fundamentals of railway braking technology in the prior art will now be recapitulated in order to facilitate the understanding of the present invention.

A locomotive is typically equipped with a device, namely a brake valve or cock, which can be operated by the driver to regulate the pneumatic pressure in the brake pipe which extends from the locomotive throughout the whole train to the last wagon.

The brake pipe serves to supply and control all the local braking apparatuses in each component vehicle of the train. According to the UIC standards for this brake pipe, as shown in the graph in FIG. 1, which correlates the value of the braking pressure pCF at the brake cylinders with the pressure pCG in the brake pipe, the pressure in the pipe may have nominal operating values in the range from 3.5 bar to 5 bar: the value of 3.5 bar corresponds to a condition of full braking of the train, while 5 bar corresponds to a condition of zero braking of the train, and intermediate pressure values, rising from 3.5 to 5 bar, correspond to train braking forces decreasing proportionately from full braking to zero braking.

On the initial application of the brakes, the braking pressure reduction is normally applied by means of a first negative pressure "step" of 0.5 bar, with a rather large time increment $\Delta p/\Delta t$, compared with the subsequent variation of said pressure. This pressure step is propagated like a sound wave within the brake pipe, at a speed close to the speed of sound in air. During the propagation in the pipe, the amplitude of said negative pressure step decreases because of frictional interference between the air and the walls and bends of the pipe.

A further reduction of the pressure in the pipe from 3.5 bar to 0 bar corresponds to the complete evacuation of the pipe, which takes place in emergency braking: this condition favours the quickest possible evacuation of the pipe, corresponding to the quickest possible application of the brakes.

Each vehicle of a railway train is equipped with a braking device, known as a distributor valve, designed to execute certain functions that are described below.

Figure 1:
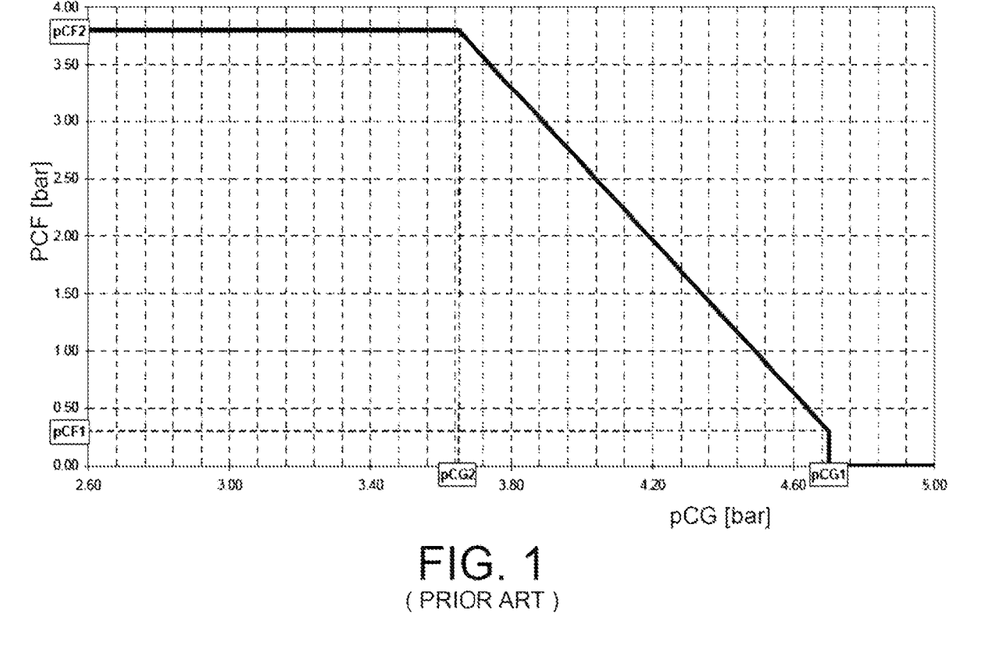
FIG. 1 (described above) is a graph illustrating the correlation between the pressure applied to brake cylinders and the pressure in the brake pipe, in the application and release of braking force on a vehicle in a train.
Figure 2:
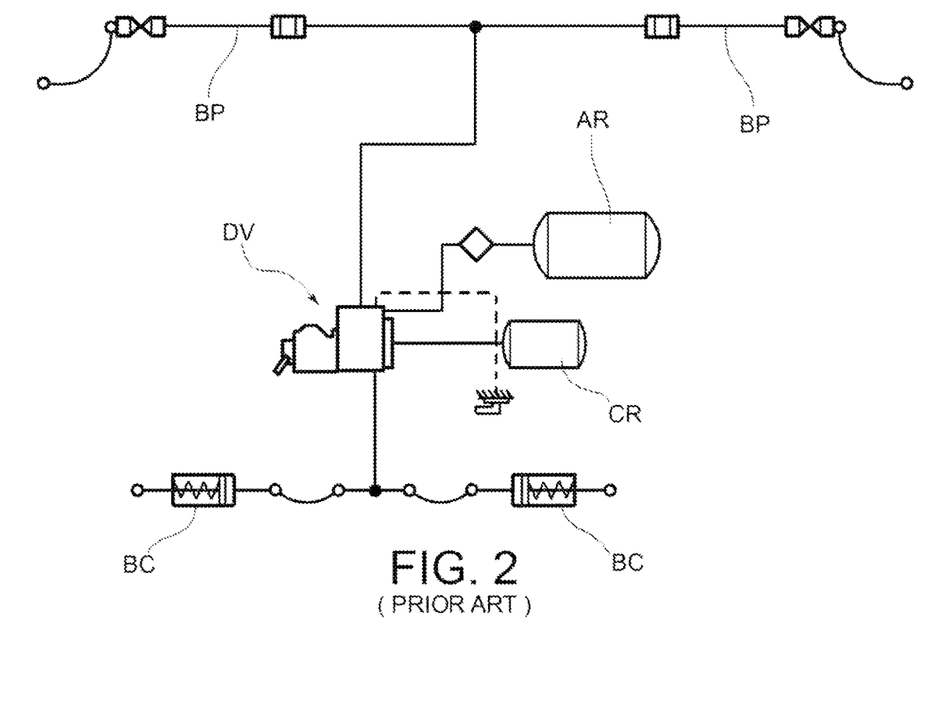
FIG. 2 (described above) shows a pneumatic diagram of a braking system of a generic vehicle in the train.

FIG. 2 shows a pneumatic diagram of the braking system of a generic vehicle in a train: a distributor valve DV, connected to the brake pipe BP and to a control reservoir CR, sends a braking pressure to brake cylinders BC, transferring air which is stored at 5 bar in an auxiliary reservoir AR, according to the diagram of FIG. 1.

The distributor valve DV has the following three main functions:

applying and releasing the braking force at the vehicle in accordance with the pressure variations in the brake pipe BP, according to the transfer function of FIG. 1;

re-supplying air to the auxiliary reservoir AR: when the pressure in this reservoir is below the pressure in the brake pipe BP after an application of the brakes, the distributor valve DV proceeds to transfer air from the pipe BP to the auxiliary reservoir AR until their pressures become equal; therefore, when the lead locomotive of the train commands the full release of the train brakes by means of the distributor valve DV, the latter restores the pressure in the pipe BP to 5 bar, and consequently the distributor valves of the wagons increase the pressure in the respective auxiliary reservoirs AR to 5 bar, thereby equalizing the pressure in the pipe BP; the time taken for the full release of the train brakes is thus substantially equal to the time taken for the complete filling of all the auxiliary reservoirs AR to 5 bar;

regenerating and propagating the first pressure "step" of 0.5 bar: the distributor valve DV can detect the presence in the pipe BP of the characteristic gradient $\Delta p/\Delta t$ of the first braking "step", even if its initial amplitude of 0.5 bar is partially attenuated as a result of the propagation in the brake pipe BP; when the presence of this gradient $\Delta p/\Delta t$ has been detected, the distributor valve DV instantaneously draws a predetermined quantity of air from the pipe BP, such that the value of the pressure "step" is immediately restored to the nominal 0.5 bar; thus the pressure "step" is "regenerated" and propagated towards the distributor valve of the next vehicle in the train; this sequence of events takes place rapidly, thereby preventing any overall delay in the propagation of the aforesaid pressure step along the brake pipe BP.

Figure 3:
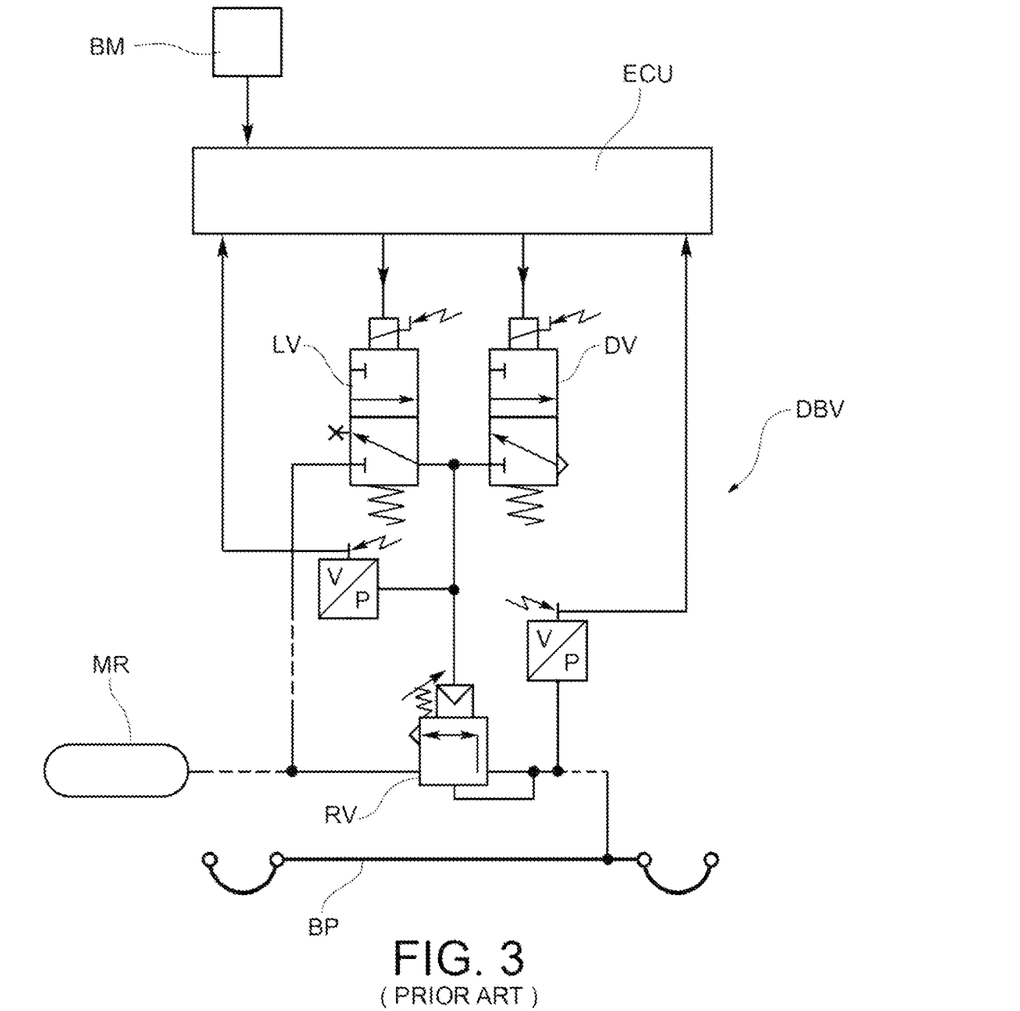
FIG. 3 shows the schematic electro-pneumatic diagram of a driver's brake valve.

The train's locomotive contains a driver's brake valve (DBV), which is an electro-pneumatic device, a schematic diagram of which is shown in FIG. 3. This device typically comprises a relay valve RV, whose reference pressure in the control chamber, henceforth termed the "set point", is controlled by a solenoid charging valve LV and by a solenoid discharge valve DV, controlled by an electronic unit ECU which interfaces with the driver's brake handle BM. If the partial or total release of the train's brakes is requested, the ECU provides a set point at a pressure of more than 3.5 bar, according to the driver's request, or equal to 5 bar if a total release is requested. The relay valve RV then starts to supply air to the brake pipe BP, drawing air from a main reservoir MR supplied by a compressor (not shown) at pressures of more than 5 bar, typically within the range from 8 bar to 10 bar, for example, interrupting the supply of air to the pipe BP only when the pressure therein has nominally equalled the set point value minus the tolerances of the relay valve.

As described above, during this step of filling the brake pipe BP, the air supplied to this pipe from the main reservoir MR through the relay valve RV contributes to the additional filling of the auxiliary reservoir AR on board each vehicle of the train.

If the partial or total application of the train's brakes is requested, the control unit ECU provides a set point pressure of less than 5 bar, according to the driver's braking request, decreasing to 3.5 bar in the case of maximum braking. After this action, the relay valve RV starts to "evacuate" the brake pipe BP by discharging air to the atmosphere, and interrupts the evacuation of this pipe BP only when the pressure therein has nominally equalled the set point value minus the tolerances of the relay valve.

When an emergency braking request is received, the pressure set point in the pipe BP is brought to 0 bar and the relay valve RV causes the complete evacuation of the pipe BP. At the same time, a high-flow emergency valve, connected between the relay valve RV and the pipe BP (and not shown in FIG. 3) is immediately opened in order to safely reduce the pressure in the pipe BP to zero, accelerating the process of its evacuation.

The length of the train evidently affects, in a substantially proportional manner, the filling and evacuation times of the pipe BP, since an increase in the length of the train is accompanied by an increase in the quantity of air to be introduced into or removed from the pipe BP through the relay valve RV and the emergency valve, and an increase in the retarding effect due to the friction of the air against the walls of the pipe BP.

In particular, because of this friction, during the dynamic phase of the phenomena of application or release of the brakes, the pressure in the pipe BP along the train is non-uniform for relatively long periods.

Figure 4:
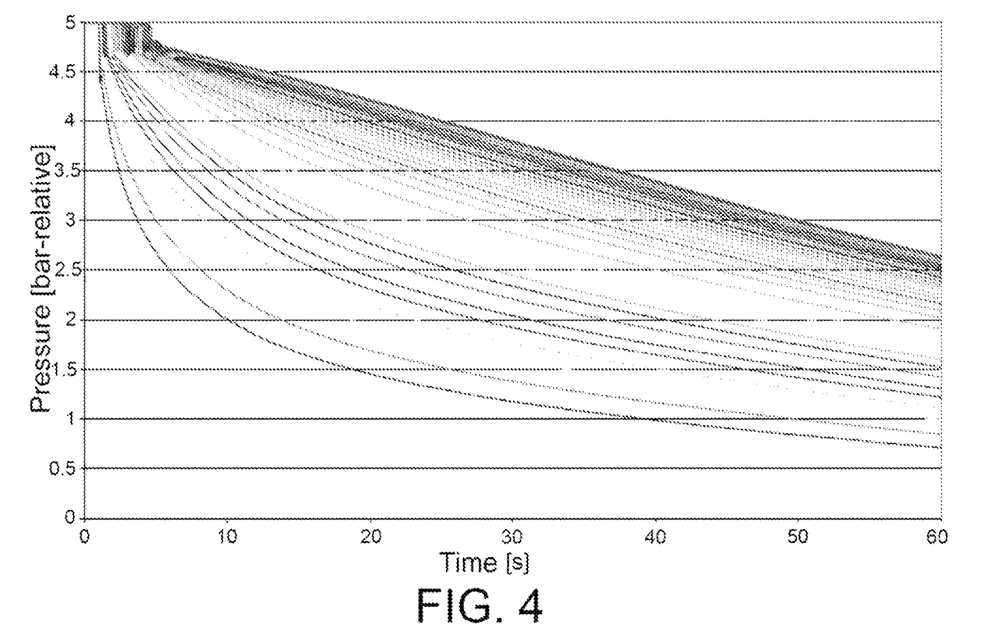
FIG. 4 (described above) is a set of graphs illustrating the distribution of the pressure in the brake pipe in the various vehicles of a train with a length of 1,200 m.

The graph in FIG. 4 shows the variation in time of the pressures in the brake pipe BP of a 1,200 m long train composed of 50 vehicles, as a result of the application of emergency braking, these pressures being measured at each vehicle: the lower curve in FIG. 4 corresponds to the variation of pressure at the vehicle next to the locomotive, while the upper curve corresponds to the variation of the pressure at the last vehicle. It can be seen that the pressure in the first vehicle reaches the value of 3.5 bar, corresponding to the maximum braking value, in about 3 s, while the pressure in the last vehicle reaches the value of 3.5 bar in about 37 s.

Figure 5:
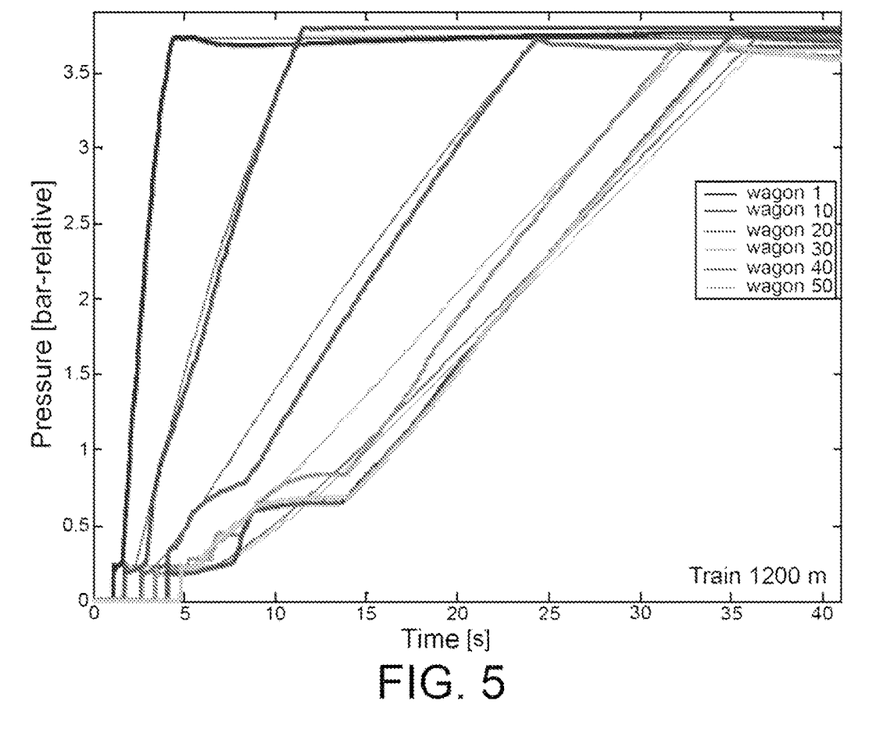
FIG. 5 (described above) is a set of graphs illustrating the delay in the application of the braking pressure to the brake cylinders in the various vehicles of a train.

Therefore, as shown by the graphs in FIG. 5, the braking pressure at the brake cylinders of the last vehicle in the train, shown here by the curve farthest to the right, reaches the maximum value with more than 30 s of delay relative to the first vehicle, indicated by the curve farthest to the left.

Similarly, when the brakes are released, the pressure in the pipe BP at the head of the train immediately matches the set point value, while the pressure at the rear of the train slowly increases in value until the whole quantity of air required to rebalance the pressures between the head and the rear and to fill all the auxiliary reservoirs (AR) has travelled from the main reservoir MR to the pipe BP through the relay valve RV. Increasing the flow rate of the relay valve RV does not resolve these problems, since the limits of the flow rate of the valve/brake pipe system are, for these lengths, determined virtually exclusively by the fluid dynamic friction of the air in the pipe BP.

The phenomena of transient non-uniformity of the pressure along the pipe BP described above have a direct effect on the dynamic behaviour of the moving train, creating longitudinal compressive forces along the train, such that conditions favourable to derailment are created. The UIC standards allow for these phenomena and, on the basis of European parameters regarding the maximum weight limits per axle, and the forces that can be achieved by the braking systems to achieve the stopping distances stipulated in European regulations, specifies a maximum safe length of 750 m for travelling trains.

A length of 750 m for goods trains now constitutes a limit which reduces the efficiency of the goods traffic: European railway operators need to be able to operate with longer trains of up to 1,500 m in length, that is to say twice the present safe limit set by the UIC standards.

To this end, it is necessary to limit the non-uniformity and delays in pressure equalization along the pipe BP during the transient in the braking phase, thereby reducing the longitudinal compressive stresses and the associated risks of derailment to safe levels. It should also be borne in mind that trains of this length, when formed with particularly heavy vehicles, may require tractive forces much higher than those that can be developed by a modern European locomotive.

It is known that a solution exists in the UIC area for increasing the traction capacity: it consists in coupling the lead locomotive to at least a second locomotive, controlled by the lead locomotive via an interconnecting cable. However, this solution has limitations, due to the fact that the maximum tractive force that the two locomotives can apply to the train corresponds to the ultimate stress of the coupling between the second locomotive and the rest of the train, and the fact that the problem of improving pressure equalization in the pipe BP during braking transients remains unsolved.

Figure 6:
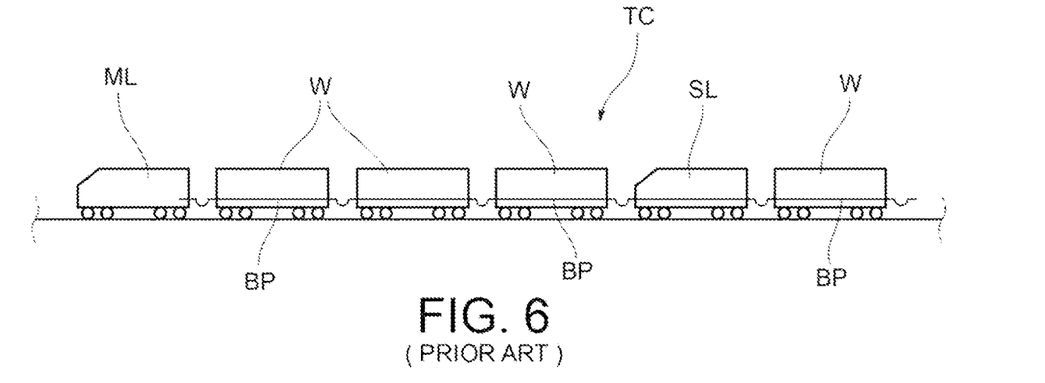
FIG. 6 (described above) is a schematic representation of a railway train comprising a master locomotive and at least one slave locomotive.

In the American railway area, regulated by the provisions of the AAR (Association of American Railroads) there is a known solution which tackles the problem more effectively; this solution consists in the use of a method called "Distributed Power", schematically illustrated in FIG. 6, where two or more locomotives are used in a railway train TC, namely a master locomotive ML at the head of the train TC and one or more slave locomotives SL, provided within the train, between the wagons W of the train. This train is associated with a control system known by the name Locotrol (registered trademark), the main characteristics of which will now be briefly described to improve the subsequent understanding of the present invention.

Figure 7:
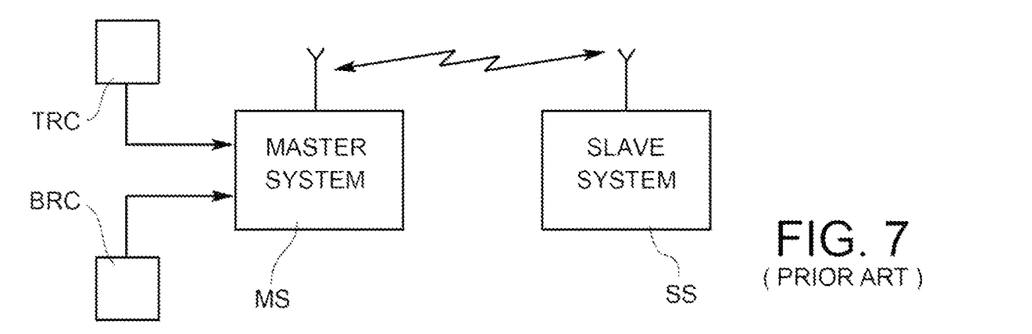
FIG. 7 (described above) is a schematic representation of a master system and a slave system for use in a train comprising a master locomotive and at least one slave locomotive.

As shown schematically in FIG. 7, this control system comprises a master system MS, located on the master locomotive ML, and one or more slave systems SS, each located on a slave locomotive SL. The master system MS communicates with the slave system(s) SS via a dedicated radio channel, operating on frequencies of about 450 MHz, supported by a predefined communications protocol. The master system MS detects in real time the actions of the driver on the control devices for traction TRC and braking BRC, and transmits corresponding data to the slave system (s) SS which have the function of locally "repeating" the commands imparted by the driver to the traction and braking apparatuses of the slave locomotives SL.

In the traction phase, having a plurality of locomotives distributed along the train, with synchronized traction commands, enables better use to be made of the available tractive force, since the peak tensile stress is not concentrated on the coupling downstream of the lead locomotive (s), as in the European solutions with twin lead locomotives, but is distributed among all the couplings downstream of the various locomotives distributed along the train. The result is equivalent to having the train divided into two or more sub-trains, individually hauled by the distributed locomotives.

During the application of the brakes, having a plurality of locomotives distributed along the train, with synchronized braking commands, means having evacuation points of the brake pipe BP distributed along the train. The result is equivalent to having the train divided into sub-trains defined by the position of the slave locomotive(s), where each segment of the brake pipe BP for each sub-train is individually evacuated at its ends. This is manifested in a substantial reduction in the non-uniformity of pressure in the pipe BP, and in the peaks of longitudinal stress along the train, during the braking transient. Furthermore, braking takes place in much shorter time intervals, corresponding to the reduction in the evacuation time of the pipe BP.

Similarly, during the release of the brakes, having a plurality of locomotives distributed along the train, with synchronized brake release commands, corresponds to having filling points of the pipe BP distributed along the train. In this case also, the result is equivalent to having the train divided into sub-trains defined by the position of the slave locomotives, where each segment of the pipe BP for each sub-train is individually filled at its ends, with a substantial reduction in brake release times.

The system reacts to a loss of radio communication between the master system MS and the slave systems SS according to a procedure known as "Comm Loss Idle Down", a description of which can easily be found in the railway literature, also available on the internet. According to this procedure, the slave systems SS start to progressively reduce any tractive effort present at the slave locomotives SL to a zero value, and simultaneously isolate the control of the pipe BP on the slave locomotives SL, leaving the task of evacuating the brake pipe BP, if a braking request is received from the driver, to the master locomotive ML alone. However, this "degraded" mode is not considered to be a hazardous situation in the AAR area, since the requirements for braking systems and stopping distances according to the AAR are much lower than the equivalent UIC requirements, and therefore the delays in evacuation and the non-uniformity of pressure in the brake pipe BP during braking transients are acceptable.

Additionally, the compression coupling between vehicles using the AAR couplings provides greater stability in the train and greater tolerance to longitudinal stresses, compared with the compressive couplings using buffers according to the UIC, especially when a train has to negotiate a bend. In general terms, the braking of an AAR railway train having two or three times the length of a UIC train, performed by evacuating the pipe BP from the master locomotive ML only, does not give rise to risks of derailment.

Railway operators in the AAR area are substantially divided between passenger and goods operators. Accordingly, there is a clear separation between railway networks for passenger traffic and those for goods transport, and there is no need to provide uniform operating requirements for the two types of traffic.

In the AAR area, the power of the radio signal between the master system MS and the slave systems SS has values close to 30 W.

Conversely, in the European environment (the UIC area), passenger traffic has to share the rail network with goods traffic, and both types of train have to obey the same regulations and comply with the same stopping distances.

The maximum radio transmission power permitted by the ETSI (European Telecommunications Standards Institute) standards at frequencies around 450 MHz is currently 500 mW, and it cannot be assumed that authorization will be obtained in future to increase the transmission power to values above 1 W for railway applications, although even this level is much lower than the power permitted by AAR regulations.

Furthermore, European rail networks have more tunnels than American goods traffic networks. It is known from the theory of propagation that frequencies of around 450 MHz undergo high attenuation in tunnels, and in a situation where the transmitting system and the receiving system are outside the opposite ends of a tunnel, communication may be blocked entirely. The probability of losing radio communication in UIC applications is therefore considerably higher than in AAR applications.

The above description makes it clear that a distributed power system according to AAR specifications, if operated according to European standards and conditions, provides a substantially reduced level of availability, and entails a higher risk of obstruction to passenger traffic. Furthermore, the Comm Loss Idle Down procedure as defined for the AAR area cannot be applied to a UIC train with a length of more than 750 m.

U.S. Pat. No. 8,190,311 B2 describes a solution, partly anticipated in EP 0 983 920, which can be implemented, for example, via the Locotrol (registered trademark) system, such that, by contrast with the provisions of the Comm Loss Idle Down procedure, if radio communication is absent, and if there is a reduction of pressure in the brake pipe BP generated by the master system MS and detected by the slave systems SS on board the slave locomotives SL, where this pressure reduction is greater than a predetermined value, for example 0.5 bar (about 7 psi), the slave systems SS on board the slave locomotives SL apply, for their part, a permanent pressure reduction of 0.7 bar (about 12 psi) or more, contributing to the further evacuation of the brake pipe BP at the points along the train where the locomotive SL are positioned, thus shortening braking times and, above all, limiting the longitudinal stresses. The removal of the pressure reduction applied by the slave locomotives SL takes place only when radio communication is restored.

However, this solution only partially resolves the problems of the applicability of distributed power methods as used in the AAR area. This is because, although the procedure according to U.S. Pat. No. 8,190,311 B2 partially reduces the longitudinal stresses and the risks of derailment, it does not provide a response to the need to continue to manoeuvre the train, even in degraded mode, if the absence of radio communication persists.

SUMMARY

One object of the present invention is therefore to propose an improved system for controlling a railway train for goods transport, with a composition of the distributed power type, and in particular for controlling the slave locomotive(s), which, if radio communication is lost, enables the driver to operate the train in traction and braking without time limits, in limited operating conditions if necessary, at reduced speed for example.

This and other objects are achieved according to the invention with a system of the type defined at the beginning of this text, the principal characteristics of which are defined in the attached claim 1.

The dependent claims define convenient embodiments of a control system according to the present invention.

BRIEF DESCRIPTION OF THE DRAWINGS

Further characteristics and advantages of the invention will be apparent from the following detailed description, provided purely by way of non-limiting example, with reference to the appended drawings, in which.

DETAILED DESCRIPTION

The present invention proposes a control system for a train comprising a master locomotive and at least one slave locomotive in an intermediate position in the train, that is to say a train as shown schematically in FIG. 6. The system relates, in particular, to the procedure for controlling the slave locomotive(s) if there is a loss of radio communication with the master locomotive.

For this purpose, as regards the pressure control in the brake pipe BP, by contrast with the Locotrol (registered trademark) system and the provisions of the Comm Loss Idle Down procedure, the following principles are followed:

when the master locomotive ML activates braking, thus reducing the pressure in the pipe BP, the slave systems SS on board the slave locomotives SL, observing the pressure in the pipe BP, must be able to identify the event and contribute to said pressure reduction by following as closely as possible the braking command imparted by the master locomotive ML, contributing in all cases to a reduction in the stopping distances and making the braking process as uniform as possible along the train, thus avoiding the development of excessive longitudinal stresses; this is achieved, as described more fully below, by locally actuating a plurality of negative pressure "steps", according to the algorithm described below; practical trials have shown that two or three pressure reduction steps in the range from 5 to 3.5 bar are sufficient for the correct control of pressure in the pipe BP;

if the master locomotive ML, after a pressure reduction in the pipe BP to a specified value, detects that the pressure in the pipe BP has stabilized at this specified value, the slave systems SS on board the slave locomotives SL must be able to recognize the pressure stabilization that has taken place, and must consequently isolate their DBV device for controlling the pipe BP from the pipe BP itself, allowing this pipe to be fully stabilized at a specified pressure value, the pipe BP being controlled solely by the master locomotive ML; this procedure allows full and coherent equalization of all the distributor valves DV along the whole train;

if the master locomotive ML initiates a reverse process of increasing the pressure again in the pipe BP to reduce the braking of the train, the slave systems SS on board the slave locomotives SL must be able to recognize this event, and, if their own devices for controlling the pressure in the pipe BP have not yet been isolated, must immediately execute, or provide for the execution of, the isolation from the pipe BP, allowing the filling of this pipe to be carried out solely by the master locomotive ML; this procedure allows the master locomotive ML to continue to maintain full and coherent equalization of all the distributor valves DV along the whole train.

At the same time, still in conditions of absence of radio communication, the following principles are followed for traction control, by contrast with the Locotrol (registered trademark) system and the provisions of the Comm Loss Idle Down procedure:

when a condition of interruption of radio communication is detected, if the train's brakes are completely off, that is to say the pipe BP is nominally at 5 bar (in a UIC system), the slave systems SS on board the slave locomotives SL must initiate a procedure of gradual reduction of traction until a predetermined value of tractive effort $\gamma$ is reached, with a predetermined gradient $\gamma 1$, the value $\gamma$ possibly being zero; when the tractive effort becomes stabilized at a value $\gamma$ other than zero, this enables the master locomotive ML to continue to haul the train with a contribution from the slave locomotives SL. By way of example, the contribution $\gamma$ can be calibrated so as to allow the master locomotive ML to haul the train, in limited speed conditions, on the specified maximum gradient of the route: in fact, if the contribution $\gamma$ is zero, in the case of a maximum gradient there would be a risk of having insufficient tractive effort available from the master locomotive ML alone for hauling the train, and the train would be immovably stopped on the line; the aforesaid values $\gamma$ and $\gamma 1$ can be initialized in advance by an operator before the start of a mission, according to the route requirements associated with the mission; alternatively, a map of values of $\gamma$ and $\gamma 1$ can be loaded into a memory of each slave system SS, and a positioning system, such as a GPS system, connected to each slave system SS can enable the values of $\gamma$ and $\gamma 1$ to be modified according to the geographic position of the train;

if the slave systems SS detect a pressure reduction in the pipe BP, they must immediately reduce the tractive effort to zero; this action is executed automatically by devices independent of the slave systems SS, known to those skilled in the art as "traction off" devices, if the master locomotive ML starts a braking procedure by reducing the pressure in the pipe BP;

if the pipe BP is brought to 5 bar nominal (UIC) as a result of a brake release procedure as described above, the slave systems SS on board the locomotives SL start a procedure of gradual incrementation of traction until the aforesaid predetermined value is reached $\gamma$, with a gradient $\gamma 2$ which is not necessarily equal to $\gamma 1$; the gradient $\gamma 2$ may also be initialized in advance by an operator before the start of the mission, or may be mapped in a memory of the slave systems SS and selected on the basis of the geographical position of the train indicated by a positioning system.

Figure 8:
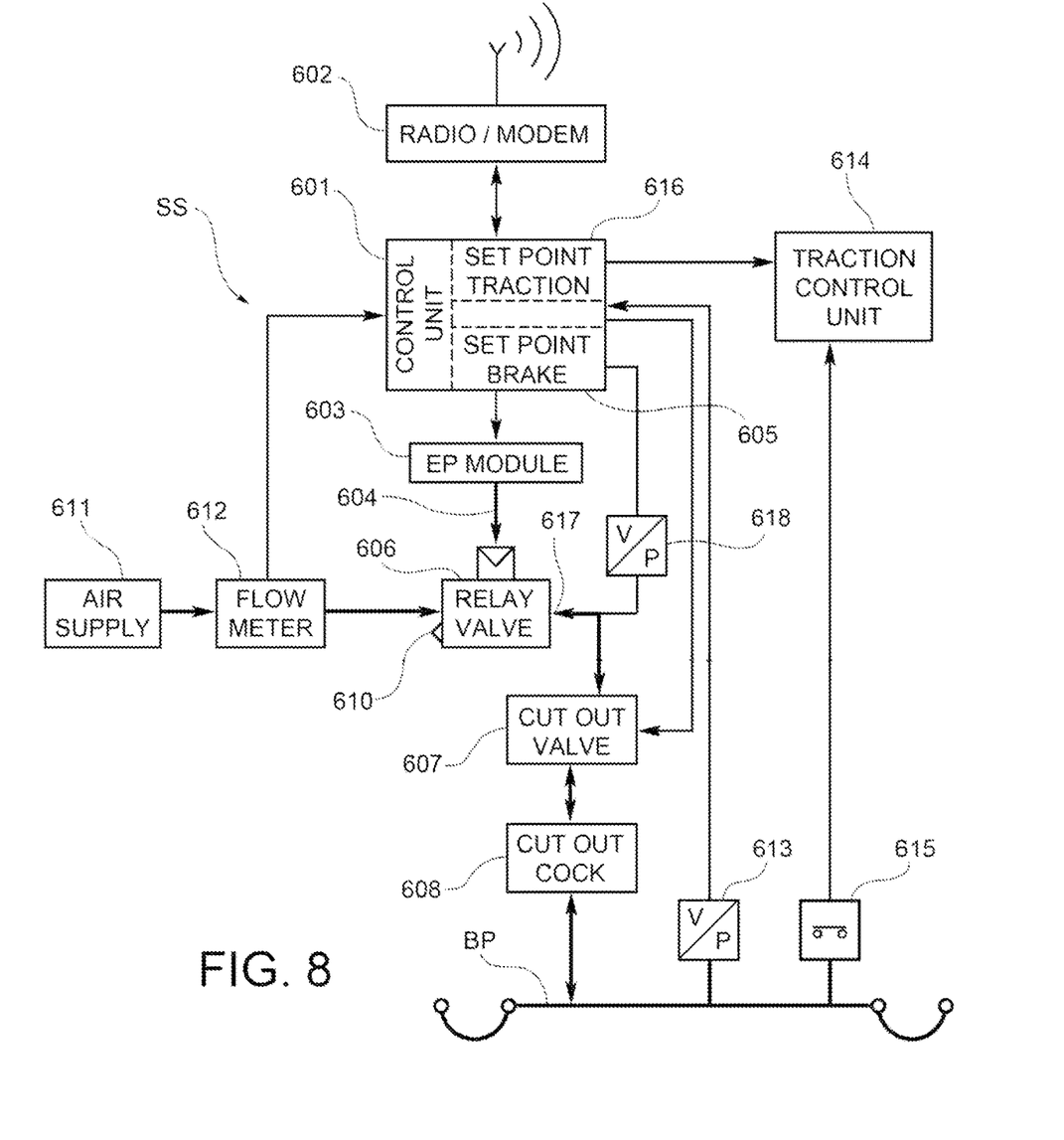
FIG. 8 is a schematic block diagram of a slave system SS for the implementation of the present invention.

FIG. 8 shows a schematic block diagram illustrating an architecture of a slave system SS.

In this figure, the thin lines indicate electrical connections and the heavy lines indicate pneumatic connections.

An electronic control unit 601 is connected to a radio/modem unit 602 used to communicate with other master systems MS or slave systems SS of the same train.

The control unit 601 is also connected to an electro-pneumatic module 603 responsible for producing a pneumatic control pressure 604 corresponding to a set point 605, said set point 605 being generated by the control unit 601. The pneumatic operating pressure 604 is supplied to the control chamber of a high-flow pneumatic relay valve 606, whose inlet port 617 is connected to the pipe BP via an isolation valve (cut-out valve) 607 and an isolation cock 608. The relay valve 606 sets the pressure in the pipe BP to the same value as that in its control chamber. If the pressure in the pipe BP is below the value of pressure present in the control chamber, the relay valve 606 increases the pressure in the pipe BP by drawing compressed air from supply devices 611, which are normally at pressures higher than the maximum permissible operating pressure value in the pipe BP, said values typically being in the range from 8 to 10 bar.

During the supply of pressure to the pipe BP, the supplied air flow is measured by the flow sensor 612 interposed between the supply devices 611 and the relay valve 606, and the value of this flow is supplied continuously to the control unit 601. When the pressure in the pipe BP equals the pressure set in the control chamber of the relay valve 606, this relay valve 606 interrupts the supply of pressure to the pipe BP.

If the pressure in the pipe BP becomes higher than the pressure value present in the control chamber, the relay valve 606 reduces the pressure in the pipe BP by drawing compressed air from this pipe and discharging it to the atmosphere via its discharge outlet 610. During the evacuation of the pipe BP, the flow meter 612 will still measure a zero flow. When the pressure in the pipe BP equals the pressure set in the control chamber of the relay valve 606, said relay valve 606 interrupts the action of evacuating said pipe.

The isolation valve 607, controlled by the control unit 601, is intended to prevent the relay valve 606 from filling or evacuating the pressure in the pipe BP.

A pressure sensor 613 measures the pressure in the pipe BP, and this measurement is acquired in real time by the control unit 601. Since the pressure sensor 613 is located at a certain distance from the relay valve 606, and in all cases downstream of the isolation valve 607 and the isolation cock 608, if the air flow passes from the pipe BP to the atmosphere through the discharge port 610 of the relay valve 606, it will create a pressure drop between the position at which the pressure sensor 613 makes its measurement and the port 617 of the relay valve 606. The control unit 601 can therefore deduce the presence or absence of an air flow passing from the pipe BP to the discharge port 610, by evaluating the difference between the pressure measured by the pressure sensor 613 and the pressure value 604 set by an electro-pneumatic module 603 for the control chamber of the relay valve 606.

An alternative solution is to insert a further pressure sensor 618 whose pneumatic port is connected near the port 617 of the relay valve 606, and whose electrical signal is sent to the control unit 601. Thus the control unit 601 can verify the presence of an air flow by differential pressure measurement using the values detected by the pressure sensors 613 and 618.

A traction control unit 614, designed to provide speed and torque control of the traction system, receives a tractive effort set point 616 from the control unit 601.

A device 615, typically a pressure switch, for detecting the pressure in the pipe BP, is connected to the traction control unit 614 and is designed to allow the traction torque to be disabled if the pressure in the pipe BP starts to decrease relative to the nominal value of 5 bar.

Figure 9:
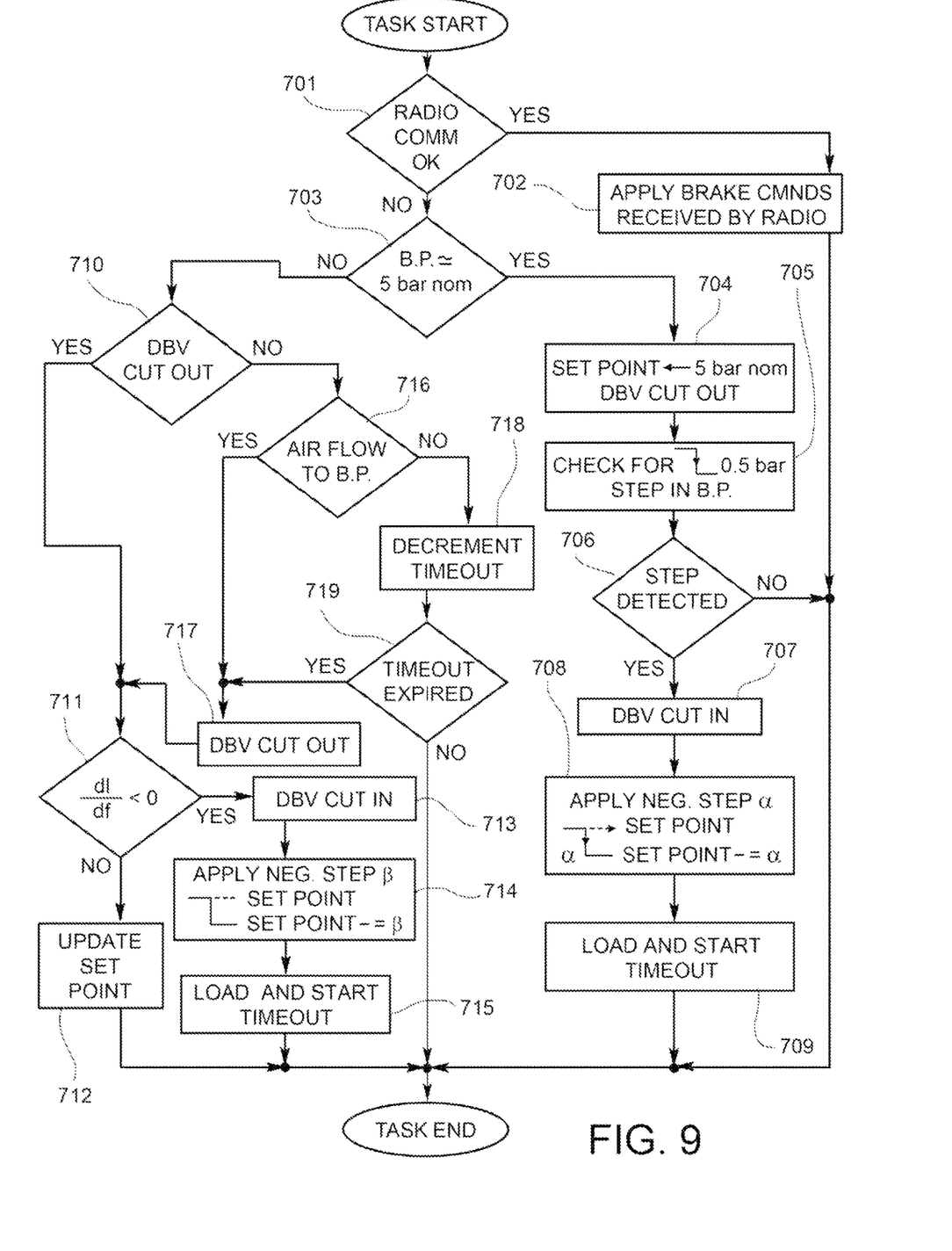
FIGS. 9 and 10 are flow diagrams illustrating braking processes and traction processes, respectively, executed by a system slave in a control system according to the present invention.

The flow diagram of FIG. 9 describes a braking process in a slave system SS. This diagram describes, in particular, a task which is scheduled periodically, for example but not exclusively every 100 ms.

A person skilled in the art will know that said flow diagram can also be executed in an infinite loop, provided that it can ensure a stable periodicity of execution, every 100 ms for example.

The diagram of FIG. 9 uses the definition "5 bar nominal" with reference to a pressure value stored in the control unit 601, this value representing the local value of the pressure in the pipe BP in the brakes-off condition of the train TC, stored during a train initialization step.

A person skilled in the art of railway braking systems will know that it is necessary to use this value, rather than the absolute value of 5 bar, since in a very long train the pressure in the pipe BP at points remote from the master locomotive ML may have slightly lower values because of losses along the pipe BP, in which case the absolute value of 5 bar could cause the algorithm to operate incorrectly.

With reference to the flow diagram of FIG. 9, if step 701 indicates that radio communication is available, the method proceeds to step 702 where the slave system SS executes any brake application or release commands received from the master system MS, and the task is then exited;

if it is found at step 702 that radio communication is absent, the method proceeds to step 703, where the control unit 601 checks, by reading the signal from the pressure sensor 613, whether the pressure in the pipe BP is approximately equal to 5 bar nominal, that is to say whether a released brakes condition is present, so that the train can continue to travel, or whether it is less than 5 bar nominal, that is to say in a condition in which the brakes are partially or fully applied; if the pressure in the pipe BP is approximately equal to 5 bar nominal, the method proceeds to step 704; otherwise it proceeds to step 710; the expression "approximately equal" means that the test performed in step 703 incorporates a tolerance range which allows for the measurement noise and micro-fluctuations of pressure;

in step 704 the set point value used by the control unit at 5 bar nominal is confirmed: the control unit 601 activates a cut-out valve 607 (FIG. 8), isolating the relay valve 606 from the pipe BP, and preventing this relay valve 606 from affecting the pressure in the pipe BP; thus the control unit of the slave system SS allows the master system MS to have exclusive control of the pressure in the pipe BP;

the method then proceeds to step 705, where the control unit 601 checks, by reading the signal from the pressure sensor 613, whether a negative step of 0.5 bar nominal is passing along the pipe BP, that is to say whether the master system MS has initiated a braking cycle;

in step 706, a decision is made on the basis of the result of the check made in step 705: if no negative pressure step has been identified, this means that the pipe BP is stable in the released brake condition, there are no other steps to be executed, and the task is exited; however, if a negative step is identified, meaning the start of brake application by the master system MS, the method proceeds to step 707 where the control unit 601 disables the cut-out valve 607, enabling the slave system SS to modify the pressure in the pipe BP by suitably controlling the relay valve 606; the method then proceeds to step 708, where the pressure set point is decreased by a quantity α>0.5 bar, for example 1 bar; as a result of this action, the electro-pneumatic unit or module 603 (FIG. 8) sets the pressure in the control chamber of the relay valve 606 to the nominal value (5 bar−α), or to 4 bar in the case of the example; thus the relay valve 606 proceeds to discharge the pipe BP locally by accelerating its evacuation to 4 bar, assisting the master system MS in the braking of the train, in a more uniform way along the train;

in step 709, a timeout is set to a predefined value and started; this timeout will be decremented in steps described below; its purpose is to indicate to the slave system SS when to interrupt the evacuation of the pipe BP, as explained below; after the start of the timeout, the task is exited;

if a pressure in the pipe BP below 5 bar nominal, that is to say a partially or fully applied brake condition, is detected in step 703, then step 710 is executed, in which a check is made on whether the slave system SS is in the "cut-in" or "cut-out" condition, that is to say whether this system is controlling the pipe BP or isolated from it;

if step 710 indicates that the slave system SS is in the "cut-out" condition, that is to say the relay valve 606 is not affecting the pressure in the pipe BP, the method proceeds to step 711, where a check is made on whether the pressure in the pipe BP is undergoing negative variations symptomatic of a possible continuation of a braking request from the master system MS;

if the pressure in the pipe BP is found to have zero or positive variations in step 711, the method proceeds to step 712, where the control unit 601 adds its own set point to the current value of the pressure in the pipe BP, to make an accurate measurement when a return is made to step 711 in the next execution of the task; the flow 711-712 is important for the present invention, since it can be seen that, in this phase, the slave system SS allows the master system MS to fill the pipe BP and thus to release the brake even in the absence of a radio signal, although much more slowly than would be the case if the contribution of the slave system SS was made in the presence of radio communication; in this mode, the train is allowed to keep moving, but with higher reaction times and possibly at reduced speed; from another viewpoint, a slave system SS operating according to the present invention continues to act in a safe condition, that is to say never releasing the brake independently if there is no radio communication, but still allowing a slow release of the brake by means of the master system MS if this is requested by the driver;

if the pressure in the pipe BP is found to have negative variations in step 711, indicating that a further request for pressure reduction in the pipe BP is in progress from the master system MS, the method proceeds to step 713 where the control unit 601, acting through the cut-out valve 607, reconnects the relay valve 606 to the pipe BP; immediately after this, in step 714, a negative pressure step β, not necessarily equal to α, is subtracted from the current set point value: this new value becomes the reference pressure in the control chamber of the relay valve 606, which proceeds to bring the pipe BP to said new set point value; in step 715, the same timeout as that described with regard to step 709 is set at a predefined value and then started;

if it is found in step 710 that the relay valve 606 is connected to the pipe BP, that is to say if said relay valve can affect the pressure value of the pipe, the method proceeds to step 716, where the control unit 601, observing the signal from the flow meter 612, checks whether the relay valve 606 is possibly transferring air from the supply devices 611 to the pipe BP; if this is the case, it indicates that the pressure in the pipe BP is below the current set point, that is to say that the master system MS is commanding a pressure below the current set point of the slave system SS, and the method proceeds to step 717, where the control unit 601 immediately isolates the relay valve from the pipe BP, preventing the readmission of air; this is an important aspect of the present invention, since it shows how, in the absence of radio communication, the slave system SS automatically prevents the admission of air into the pipe BP, that is to say it opposes an evacuation in progress by the master system MS, said evacuation indicating a decision to increase the braking level to a value greater than that corresponding to the current set point value present in the master system MS; the method then proceeds to step 711, described above: in practice, as a result of step 717, there will be a pressure reduction in the pipe BP which will cause the relay valve to operate at a lower value of β bar, thus restarting the evacuation of the pipe BP, acting in the same direction as that in which the master system MS is acting;

if, in step 716, the control unit 601 verifies, by reading the signal of the flow meter 612, that there is no air flow from the supply devices 611 to the pipe BP 609, then the relay valve 606 has reached the same pressure value as that commanded by the master system MS, or is still evacuating the pipe BP: this second case may be due to two different situations, namely a first situation, which we shall call S1, in which the pipe BP is still being evacuated by both the master system MS and the slave system SS, and a second, which we shall call S2, in which the negative decrement applied to the pressure set point (regardless of whether it is α or the subsequent further decrement β, or further decrements n*β due to further iterations in the flow diagram) has brought the set point of the slave system SS to a value below that set in the master system MS; in this second situation (S2) the two set points are in a conflict situation, since the relay valve of the master system MS continues to fill the pipe BP, attempting to oppose the relay valve of the slave system SS, which in turn is trying to oppose the relay valve of the master system MS by evacuating the pipe BP from its side; in this situation, the timeout described in steps 709 and 715 comes into use: the timeout is decremented in step 718, and in step 719 a check is made as to whether this timeout has been reset to zero, and if this is not the case the task is exited; if the timeout has reached a zero value, the method proceeds to step 717 described above; in this case, if step 711 finds a positive (or zero) pressure gradient in the pipe BP, this means that the system is in the situation S2, and therefore will allow the master system MS to fill the pipe BP until its value becomes uniform along the whole of its length; conversely, if step 711 finds a negative value, this means that the system is in the situation S1, and then, proceeding to step 713, the slave system SS will recommence the evacuation of the pipe BP by assisting the master system.

Additionally, and by contrast with the provisions of U.S. Pat. No. 8,190,311 B2, the present invention allows for a loss of the radio communication channel during a braking phase that has already started. In fact, the most complicated situation occurs when braking has been started and executed by the system by means of a radio command, that is to say during the transit in the path of steps 701, 702, and the pipe BP has already reached a stable value: if communication is lost in this phase, the system can no longer benefit from the information represented by the negative step of 0.5 bar; in the diagram, this condition is represented by the sequence of steps 701, 703, 710, 711, where in step 711 the slave system SS checks whether further negative variations are appearing, indicating further evacuation of the pipe BP by the master system MS; because of the length of the pipe BP between the master and slave locomotives, if the control unit 601 were to keep the relay valve 606 coupled to the pipe BP by permanent activation of the isolation valve 607, the relay valve 606 would actively set the pressure value corresponding to the set point value 605 (FIG. 8): in this condition, locally, the pressure value in the pipe BP would be only minimally affected by variations, even large ones, set by the master system MS: it would then be impossible for the control unit 601 of the slave system SS to detect, by the continuous measurement made via the sensor 613, the pressure variations in the pipe BP symptomatic of a pressure change commanded by the master system MS, at least in sufficient time to prevent excessive non-uniformity of the pressure value in the pipe BP; in order to overcome this drawback, even in a condition where radio communication is present, the control unit 601 keeps the isolation valve 607, and consequently the relay valve 606 coupled to the pipe BP, energized only during the pressure transients, that is to say only when the dynamic actions performed by the master system MS must be duplicated; when the control unit 601 has checked, by processes equivalent to that described with reference to the flow diagram of FIG. 9, that the pipe BP has stabilized at the value set by the master system MS, said control unit 601 will proceed to de-energize the isolation valve 607, thus isolating the relay valve 60 from the pipe BP, and therefore allowing the pressure in the pipe BP to vary locally within the shortest possible times according to the pressure variations set by the master system MS.

Figure 10:
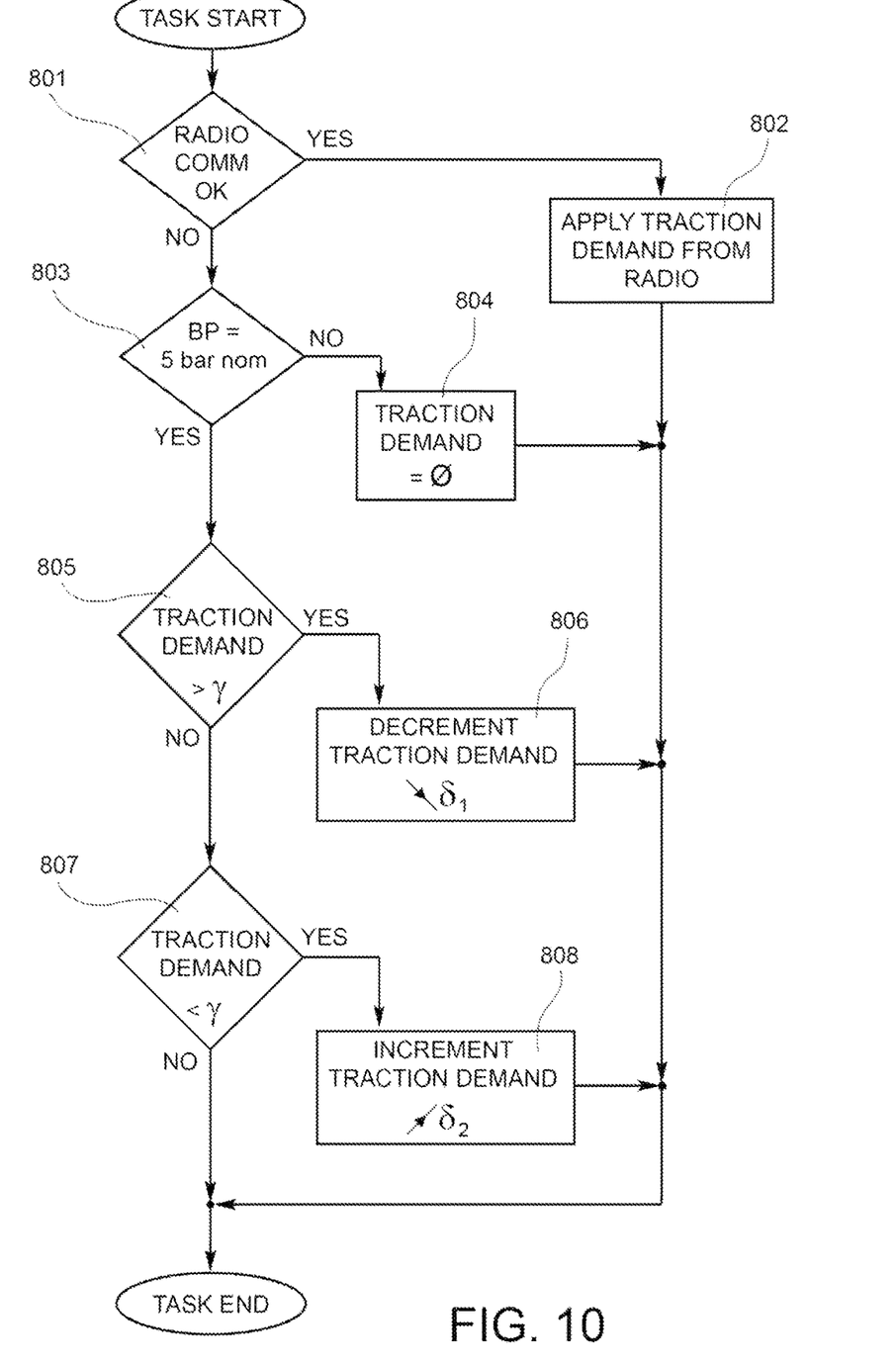

The flow diagram of FIG. 10 describes a traction control process executed by a slave system SS. Similarly to the diagram of FIG. 9, the diagram of FIG. 10 shows, in particular, a task which is scheduled periodically, for example every 100 ms. A person skilled in the art will know that this flow diagram can also be executed in an infinite loop, provided that it can ensure a stable periodicity of execution, every 100 ms for example.

Thus, with reference to the diagram of FIG. 10:

if it is found in step 801 that radio communication is present, step 802 is executed, in which the slave system SS executes any traction application or release commands received from the master system MS, and the task is then exited;

if step 801 indicates that radio communication is absent, the method proceeds to step 803 where it checks whether the pressure in the pipe BP is greater than the value (5 bar nominal−ε), where ε may have a value of 0.5 bar, for example: if this pressure is less than (5 bar nominal−ε), the method proceeds to step 804 where the control unit 601 resets the traction request for the traction control unit 614 to zero; the same action is performed in any case by the device 615, ensuring that, if a braking request is present, the traction system immediately ceases to generate tractive effort;

if in step 803 the pressure in the pipe BP is greater than the value (5 bar nominal−ε), the method proceeds to step 805, where it checks whether the traction request value is greater than the value γ at which the traction request should settle if the radio signal is lost, if no brake application is applied; if this is the case, the method proceeds to step 806, where the value of the traction request to be sent to the traction control unit 614 is decremented by a value such that the gradient δ1 is created, after which the task is exited;

if in step 805 the value of the traction request is found to be not more than the value γ, the method proceeds to step 807, where it checks whether the value of the traction request is less than the value γ: if this is the case, it proceeds to step 808, where the value of the traction request to be sent to the traction control unit is incremented by a value such that the gradient δ2 is created, after which the task is exited;

if in step 807 the value of the traction request is found to be less than the value γ, this means that the value of the traction request is equal to γ; that is to say, the slave locomotive SL is providing traction at the predetermined value for the case of a loss of radio signal.

Naturally, the principle of the invention remaining the same, the forms of embodiment and the details of construction may be varied widely with respect to those described and illustrated, which have been given purely by way of non-limiting example, without thereby departing from the scope of the invention as defined by the attached claims.

The invention claimed is:

1. Control system for a railway train for the transport of goods, comprising a plurality of wagons, a master locomotive placed at the head of the train and one or more slave locomotives distributed in the train, the train being provided with a pneumatic brake pipe which extends throughout the train, the master locomotive being provided with a master control system for controlling the train, the at least one slave locomotive being provided with a slave control system subordinated to the master control system for controlling the train, said master and slave control systems being adapted to communicate with each other through a radio channel, the or each slave system being designed to control traction apparatus, control apparatus for controlling the pressure in the brake pipe and emergency brake application apparatus for the corresponding slave locomotive and for retransmitting to the master system signals indicating the status of said apparatuses of the slave locomotive, the master system being adapted to interpret traction commands and braking commands imparted by the driver of the master locomotive and to transmit corresponding commands to the slave system as traction set point values and pressure set point values in the brake pipe to be implemented locally, said master system being further adapted to interpret emergency braking commands imparted by the driver of the master locomotive or by on-board systems of the master locomotive and to transmit corresponding emergency brake application commands to the slave systems to be implemented locally;

the control system being characterized in that in case of a loss of radio communication between the master system and the slave system(s), the or each slave control system is designed to:

analyse the variations of the pressure in the brake pipe and of the air flow supplied to said brake pipe;

in the presence of a negative gradient of the pressure in the brake pipe, connect to the brake pipe a controller device adapted to actively control the pressure in said pipe, and operate said controller device so as to create one or more successive negative steps of the set point value of the pressure in the brake pipe;

at the end of the application of the or each negative pressure set point value in the brake pipe, monitor the air flow supplied to the brake pipe and isolate said controller device from said pipe when a local supply of air to said pipe by said controller device is detected;

after the actuation of the or each negative step of the braking pressure set point value, in the absence of a detection of local supply of air to the brake pipe by said controller device, isolate said controller device from the brake pipe on the expiry of a timeout started when the controller device is coupled to the brake pipe, and in the presence of a positive gradient of the pressure in the brake pipe, keep said controller device isolated from the brake pipe.

2. System according to claim 1, wherein the amplitudes of the negative steps of pressure set point values in the brake pipe are dependent on the absolute value and the gradient of said pressure in the brake pipe, the values of said amplitudes being stored in advance in the associated slave system.

3. System according to claim 2, wherein a reference value of pressure in the brake pipe corresponding to the condition of released brakes is initialized in advance and subsequently updated.

4. System according to claim 1, wherein the each slave system is designed to additionally connect said controller device to the brake pipe in the presence of radio communication between the master system and the slave system and in the presence of a request for variation of the pressure received by the master system; the slave system executing the pressure variation by a corresponding variation of the brake pipe pressure set point value, detecting the completion of the action resulting from the variation of the pressure set point value in the brake pipe, and isolating the controller device from the brake pipe.

5. System according to claim 1, wherein, when a traction set point value exceeds a predetermined value, in the range from zero to a predetermined maximum admissible value, the or each slave system reduces said traction set point value to said predetermined value with a predetermined gradient;

wherein, when the traction set point value is lower than said predetermined value, the or each slave system increases the traction set point value up to said predetermined value with a second predetermined gradient; and wherein, when the or one slave system detects a condition of braking the train, said slave system resets to zero and keeps to zero said traction set point value until the braking operation ceases.

6. System according to claim 5, wherein the predetermined value of the traction set point and the values of said first and second gradients are stored in a memory of the or each slave system.

7. System according to claim 5, wherein the predetermined value of the traction set point and the values of said first and second gradients are mapped in the or each slave system in accordance with the characteristics of mission profiles, and are selectable on the basis of the geographic position of the train indicated by a positioning system.

* * * * *